US011848122B2

(12) United States Patent
Kwon et al.

(10) Patent No.: US 11,848,122 B2
(45) Date of Patent: Dec. 19, 2023

(54) INSULATION FILM COMPOSITION FOR GRAIN-ORIENTED ELECTRICAL STEEL SHEET, METHOD FOR FORMING INSULATION FILM FOR GRAIN-ORIENTED ELECTRICAL STEEL SHEET USING SAME, AND GRAIN-ORIENTED ELECTRICAL STEEL SHEET

(71) Applicant: POSCO, Pohang-si (KR)

(72) Inventors: Min Serk Kwon, Pohang-si (KR); Hyun Seok Ko, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 17/721,936

(22) Filed: Apr. 15, 2022

(65) Prior Publication Data

US 2022/0238251 A1    Jul. 28, 2022

Related U.S. Application Data

(62) Division of application No. 16/065,318, filed as application No. PCT/KR2016/015117 on Dec. 22, 2016, now Pat. No. 11,335,475.

(30) Foreign Application Priority Data

Dec. 22, 2015   (KR) ........................ 10-2015-0184047

(51) Int. Cl.
*H01B 3/12*   (2006.01)
*C09D 7/61*   (2018.01)
*C09D 7/40*   (2018.01)
*C21D 8/12*   (2006.01)
*B82Y 30/00*  (2011.01)
*B82Y 40/00*  (2011.01)

(52) U.S. Cl.
CPC ................ *H01B 3/12* (2013.01); *C09D 7/61* (2018.01); *C09D 7/67* (2018.01); *C09D 7/68* (2018.01); *C21D 8/1283* (2013.01); *B82Y 30/00* (2013.01); *B82Y 40/00* (2013.01)

(58) Field of Classification Search
None
See application file for complete search history.

(56) References Cited

U.S. PATENT DOCUMENTS

2009/0324837 A1   12/2009   Han et al.

FOREIGN PATENT DOCUMENTS

| CN | 101040022 A | 9/2007 |
|---|---|---|
| CN | 101351574 A | 1/2009 |
| CN | 101429409 A | 5/2009 |
| CN | 103709796 A | 4/2014 |
| CN | 104025207 A | 9/2014 |
| CN | 104726662 A | 6/2015 |
| CN | 110634592 B | 11/2021 |
| JP | S59-70723 A | 4/1984 |
| JP | H03-39484 A | 2/1991 |
| JP | H06-73555 A | 3/1994 |
| JP | 2000-026942 A | 1/2000 |
| JP | 2001-303214 A | 10/2001 |
| JP | 2002-220644 A | 8/2002 |
| JP | 2003-301271 A | 10/2003 |
| JP | 2009-052060 A | 3/2009 |
| JP | 2009-545674 A | 12/2009 |
| JP | 2011-530012 A | 12/2011 |
| JP | 2013-505365 A | 2/2013 |
| JP | 2015-509994 A | 4/2015 |
| KR | 10-2000-0038157 A | 7/2000 |
| KR | 10-0360097 B1 | 7/2000 |
| KR | 10-2002-0084218 | 11/2002 |
| KR | 10-00762465 B1 | 10/2007 |
| KR | 10-0817157 B1 | 3/2008 |
| KR | 10-2011-0010483 A | 2/2011 |
| KR | 10-2012-0073655 A | 7/2012 |
| KR | 10-1195220 B1 | 10/2012 |
| KR | 10-2013-0055912 A | 5/2013 |
| KR | 10-2014-0131790 A | 11/2014 |
| KR | 10-2015-0001104 A | 1/2015 |
| KR | 10-2015-0073802 | 7/2015 |
| KR | 10-1623874 B1 | 5/2016 |
| TW | 397869 B | 7/2000 |
| WO | 2009-123156 A1 | 10/2009 |

OTHER PUBLICATIONS

Machine translation KR 10-2013-055912, provided by espacenet.com (Year: 2023).*
International Search Report issued in International Application No. PCT/KR2016/015117, dated Mar. 24, 2017.
U.S. Notice of Allowance dated Jan. 20, 2022 issued in U.S. Appl. No. 16/065,318.
Chinese Notice of Allowance dated Sep. 10, 2021 issued in Chinese Patent Application No. 201910974549.3 (with English translation).
U.S. Non-Final Office Action dated Aug. 19, 2021 issued in U.S. Appl. No. 16/065,318.
Japanese Office Action dated Nov. 10, 2020 issued in Japanese Patent Application No. 2019-193082.
Japanese Notice of Allowance dated Nov. 10, 2020 issued in Japanese Patent Application No. 2018-533048.

(Continued)

*Primary Examiner* — Alexandre F Ferre
(74) *Attorney, Agent, or Firm* — Morgan, Lewis & Bockius LLP

(57) ABSTRACT

An insulation film composition for a grain-oriented electrical steel sheet according to an exemplary embodiment of the present invention includes 10-50 parts by weight of metal silicate or organic silicate, 20-70 parts by weight of inorganic nanoparticles and 0.1-20 parts by weight of cobalt hydroxide. The insulation film composition can further include 10-50 parts by weight of metal phosphate, and/or 5-30 parts by weight of inorganic nanoparticles having a particle diameter of 1 nm to less than 10 nm, and/or inorganic nanoparticles having a particle diameter of 10 to 100 nm and/or 0.1-20 parts by weight of chromium oxide.

5 Claims, No Drawings

(56) References Cited

OTHER PUBLICATIONS

Chinese Office Action dated Feb. 27, 2020 issued in Chinese Patent Application No. 2016800754.
Chinese Office Action dated May 23, 2019 issued in Chinese Patent Application No. 201680075465.0.
Extended European Search Report dated Dec. 6, 2018 issued in European Patent Application No. 16879374.3.
Japanese Office Action dated Jul. 23, 2019 issued in Japanese Patent Application No. 2018-533048.

* cited by examiner

INSULATION FILM COMPOSITION FOR GRAIN-ORIENTED ELECTRICAL STEEL SHEET, METHOD FOR FORMING INSULATION FILM FOR GRAIN-ORIENTED ELECTRICAL STEEL SHEET USING SAME, AND GRAIN-ORIENTED ELECTRICAL STEEL SHEET

CROSS REFERENCE OF RELATED APPLICATIONS

This application is a divisional of U.S. patent application Ser. No. 16/065,318, filed on Jun. 22, 2018, which is the U.S. National Phase under 35 U.S.C. § 371 of International Application No. PCT/KR2016/015117, filed on Dec. 22, 2016, which claims the benefit of Korean Patent Application No. 10-2015-0184047, filed on Dec. 22, 2015, the entire contents of each application are hereby incorporated by reference.

TECHNICAL FIELD

The present invention relates to an insulation film composition for a grain-oriented electrical steel sheet, a method for forming an insulation film for the grain-oriented electrical steel sheet using the same, and a grain-oriented electrical steel sheet.

BACKGROUND ART

A grain-oriented electrical steel sheet is a soft magnetic material with excellent magnetic properties in a rolling direction consisting of grains with a Goss orientation having a crystal orientation of a steel sheet of {110}<001>.

These grain-oriented electrical steel sheets are formed by high temperature annealing for primary recrystallization annealing and secondary recrystallization after being usually rolled to a final thickness of 0.15 to 0.35 mm through hot rolling, hot rolling annealing, and cold rolling after slab heating.

In this case, it is known that, during high temperature annealing, the degree of integration of the Goss orientation to be secondarily recrystallized becomes higher as the temperature increase rate is slower, and the magnetism is excellent. Generally, the temperature increase rate of the grain-oriented electrical steel sheet is not more than 15° C. per hour during high temperature annealing. It takes 2 to 3 days to raise the temperature and requires more than 40 hours of purification annealing, and thus may be a high energy consumption process.

Also, a current final high temperature annealing process performs batch type annealing in a coil state, which causes processing difficulties as follows. First, due to heat treatment in the coil state, a temperature difference between outer and inner parts of coil occurs, and thus the same heat treatment pattern may not be applied to each part, resulting in a magnetism deviation between the outer and inner parts. Second, since various surface defects occur during a process of coating the surface of MgO after decarburization annealing and forming base coating during high temperature annealing, a yarn yield decreases. Third, since a decarburized plate on which decarburization annealing is completed is wound in a coil shape, annealed at high temperature, and then subjected to insulation coating through flat carbonization annealing again, the production process is divided into three stages, resulting in a problem of decrease in the yarn yield.

DISCLOSURE

Technical Problem

The present invention has been made in an effort to provide an insulation film composition for a grain-oriented electrical steel sheet, a method for forming an insulation film for the grain-oriented electrical steel sheet using the same, and the grain-oriented electrical steel sheet.

Technical Solution

An exemplary embodiment of the present invention provides an insulation film composition for a grain-oriented electrical steel sheet including 10-50 parts by weight of metal silicate or organic silicate, 20-70 parts by weight of inorganic nanoparticles and 0.1-20 parts by weight of cobalt hydroxide.

The metal silicate may be at least one selected from the group consisting of sodium silicate, potassium silicate, calcium silicate, magnesium silicate, manganese silicate and strontium silicate, and the organic silicate may be tetraalkylososilicate.

The inorganic nanoparticles may be at least one selected from alumina ($Al_2O_3$), silica ($SiO_2$), titania ($TiO_2$), zirconia ($ZrO_2$), yttrium oxide ($Y_2O_3$) and magnesium oxide (MgO).

An average particle diameter of the inorganic nanoparticles may be 1 nm to 100 nm.

The inorganic nanoparticles may include inorganic nanoparticles having a particle diameter of 1 nm to less than 10 nm and inorganic nanoparticles having a particle diameter of 10 nm to 100 nm.

The inorganic nanoparticles may include inorganic nanoparticles having the particle diameter of less than 1 nm to less than 10 nm, inorganic nanoparticles having a particle diameter of less than 10 nm to less than 30 nm, and inorganic nanoparticles having a particle diameter of 30 nm to 100 nm.

The insulation film composition may further include 10-25 parts by weight of a solvent.

The insulation film composition may further include 10-50 parts by weight of metal phosphate.

Another embodiment of the present invention provides a method for forming an insulation film of a grain-oriented electrical steel sheet including preparing the grain-oriented electrical steel sheet and an insulation film composition for the grain-oriented electrical steel sheet; applying the insulation film composition for the grain-oriented electrical steel sheet to a surface of the grain-oriented electrical steel sheet; heat-treating the grain-oriented electrical steel sheet coated with the insulation film composition for the grain-oriented electrical steel sheet; and obtaining the grain-oriented electrical steel sheet having the insulation film on its surface, wherein the insulation film composition for the grain-oriented electrical steel sheet includes 10-50 parts by weight of metal silicate or organic silicate, 20-70 parts by weight of inorganic nanoparticles and 0.1-20 parts by weight of cobalt hydroxide.

The grain-oriented electrical steel sheet may include 2.0-4.0% of Si, 0.002% or less of C (excluding 0%) and 0.01-0.06% of Sb in weight %, and the remnant including Fe and other inevitable impurities.

The grain-oriented electrical steel sheet may be formed by including steps of: providing a slab including 2.0-4.0% Si, 0.1-0.4% C, 0.01-0.06% Sb, and the remnant including Fe and other inevitable impurities; re-heating the slab; hot-rolling the slab to form a hot-rolled steel sheet; subjecting the hot-rolled steel sheet to hot-rolled annealing; cold-rolling the hot-rolled steel sheet subjected to hot-rolled annealing; decarburization annealing the cold-rolled steel sheet; cold-rolling the steel sheet on which decarburization annealing is completed; and finally annealing the completely cold-rolled steel sheet.

Decarburization annealing may be performed at a temperature of 850° C. to 1000° C. and a dew point temperature of 50° C. to 70° C.

The finally annealing may include a first step of annealing at a temperature of 900° C. to 1000° C. and a dew point temperature of 55° C. to 65° C., and a second step of annealing at a temperature of 1000° C. to 1200° C. and an atmosphere of at least 75 vol % of Hz.

The insulation film composition for the grain-oriented electrical steel sheet may be coated on a surface of the grain-oriented electrical steel sheet in a range of 0.5 g/m² to 7 g/m².

The grain-oriented electrical steel sheet coated with the insulation film composition for the grain-oriented electrical steel sheet may be heat-treated at a temperature of 250° C. to 950° C.

Yet another embodiment of the present invention provides a grain-oriented electrical steel sheet including the grain-oriented electrical steel sheet; and an insulation film formed on a surface of the grain-oriented electrical steel sheet, wherein the insulation film includes 10-50 parts by weight of metal silicate or organic silicate, 20-70 parts by weight of inorganic nanoparticles and 0.1-20 parts by weight of cobalt hydroxide.

The grain-oriented electrical steel sheet may have a volume fraction of 90% or more of grains having an orientation within 15 degrees from a {110}<001> orientation.

The grains having the orientation within 15 degrees from the {110}<001> orientation, a ratio of the grains having a size of 30 μm to 1000 μm may be 80% or more.

Yet another embodiment of the present invention provides an insulation film composition for a grain-oriented electrical steel sheet including 10-50 parts by weight of metal phosphate, 5-30 parts by weight of inorganic nanoparticles having a particle diameter of 1 nm to less than 10 nm, 10-40 parts by weight of inorganic nanoparticles having a particle diameter of 10 to 100 nm and 0.1-20 parts by weight of chromium oxide.

The metal phosphate may include at least one metal selected from Mg, Al, Ca, Fe, Mn, Sr, Zr and Ba.

The inorganic nanoparticles having a particle diameter of 10 nm to 100 nm may include 5-20 parts by weight of inorganic nanoparticles having a particle diameter of 10 nm to less than 30 nm and 5-20 parts by weight of inorganic nanoparticles having a particle diameter of 30 nm to less than 100 nm.

The inorganic nanoparticles may be at least one selected from alumina ($Al_2O_3$), silica ($SiO_2$), titania ($TiO_2$), zirconia ($ZrO_2$), yttrium oxide ($Y_2O_3$) and magnesium oxide (MgO).

The chromium oxide may be at least one selected from chromium trioxide, chromium oxide, and chromium oxide.

The insulation film composition may further include 10-25 parts by weight of a solvement.

Yet another embodiment of the present invention provides a method for forming an insulation film of a grain-oriented electrical steel sheet including preparing the grain-oriented electrical steel sheet and an insulation film composition for the grain-oriented electrical steel sheet; applying the insulation film composition for the grain-oriented electrical steel sheet to a surface of the grain-oriented electrical steel sheet; heat-treating the grain-oriented electrical steel sheet coated with the insulation film composition for the grain-oriented electrical steel sheet; and obtaining the grain-oriented electrical steel sheet having the insulation film on its surface, wherein the insulation film composition for the grain-oriented electrical steel sheet includes 10-50 parts by weight of metal phosphate, 5-30 parts by weight of inorganic nanoparticles having a particle diameter of 1 nm to less than 10 nm, 10-40 parts by weight of inorganic nanoparticles having a particle diameter of 10 to 100 nm and 0.1-20 parts by weight of chromium oxide.

The grain-oriented electrical steel sheet may include 2.0-4.0% of Si, 0.002% or less of C (excluding 0%) and 0.01-0.06% of Sb in weight %, and the remnant including Fe and other inevitable impurities.

The grain-oriented electrical steel sheet may be formed by including steps of: providing a slab including 2.0-4.0% Si, 0.1-0.4% C, 0.01-0.06% Sb, and the remanant including Fe and other inevitable impurities; re-heating the slab; hot-rolling the slab to form a hot-rolled steel sheet; subjecting the hot-rolled steel sheet to hot-rolled annealing; cold-rolling the hot-rolled steel sheet subjected to hot-rolled annealing; decarburization annealing the cold-rolled steel sheet; cold-rolling the steel sheet on which decarburization annealing is completed; and finally annealing the completely cold-rolled steel sheet.

Decarburization annealing may be performed at a temperature of 850° C. to 1000° C. and a dew point temperature of 50° C. to 70° C.

The finally annealing may include a first step of annealing at a temperature of 900° C. to 1000° C. and a dew point temperature of 55° C. to 65° C., and a second step of annealing at a temperature of 1000° C. to 1200° C. and an atmosphere of at least 75 vol % of Hz.

The insulation film composition for the grain-oriented electrical steel sheet may be coated on a surface of the grain-oriented electrical steel sheet in a range of 0.5 g/m² to 7 g/m².

The grain-oriented electrical steel sheet coated with the insulation film composition for the grain-oriented electrical steel sheet may be heat-treated at a temperature of 250° C. to 950° C.

Yet another embodiment of the present invention provides a grain-oriented electrical steel sheet including the grain-oriented electrical steel sheet; and an insulation film formed on a surface of the grain-oriented electrical steel sheet, wherein the insulation film includes 10-50 parts by weight of metal phosphate, 5-30 parts by weight of inorganic nanoparticles having a particle diameter of 1 nm to less than 10 nm, 10-40 parts by weight of inorganic nanoparticles having a particle diameter of 10 to 100 nm and 0.1-20 parts by weight of chromium oxide.

The grain-oriented electrical steel sheet may have a volume fraction of 90% or more of grains having an orientation within 15 degrees from a {110}<001> orientation.

The grains having the orientation within 15 degrees from the {110}<001> orientation, a ratio of the grains having a size of 30 μm to 1000 μm may be 80% or more.

Advantageous Effects

According to an exemplary embodiment of the present invention, provided is a method for forming a grain-oriented electrical steel sheet capable of continuous annealing without batch type annealing in a coil state during final annealing. In other words, the oriented electrical steel sheet may be produced with only a short time of annealing, and a process of winding a cold rolled steel sheet may be omitted.

Also, according to another exemplary embodiment of the present invention, the oriented electrical steel sheet may be formed without using a grain growth inhibitor. Therefore, carbonitriding annealing may be omitted.

Also, according to another exemplary embodiment of the present invention, an insulation film having excellent adhesion may be formed on a surface of the grain-oriented electrical steel sheet.

MODE FOR INVENTION

The terms first, second and third are used to describe various parts, components, regions, layers and/or sections, but are not limited thereto. These terms are used only to distinguish any part, component, region, layer or section from other parts, component, region, layer or section. Thus, the first portion, component, region, layer or section described below may be referred to as a second portion, component, region, layer or section within the scope of the present invention.

The terminology used herein is for the purpose of referring only to a specific embodiment and is not intended to limit the present invention. The singular forms used herein also include plural forms, unless the phrases express this to the contrary. As used in the specification, the meaning of "comprising" embodies a particular property, domain, integer, step, operation, element and/or component, and does not exclude the existence or addition of other property, domain, integer, step, operation, element and/or component.

Unless otherwise defined, all terms including technical and scientific terms used herein have the same meaning as commonly understood by one of ordinary skill in the art to which the present invention belongs. Commonly used predefined terms are further interpreted as having a meaning consistent with the relevant technical literature and the present disclosure, and are not to be construed as ideal or very formal meanings unless defined otherwise.

Unless otherwise stated, % means wt %.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

An insulation film composition for a grain-oriented electrical steel sheet according to an exemplary embodiment of the present invention includes 10-50 parts by weight of metal silicate or organic silicate, 20-70 parts by weight of inorganic nanoparticles and 0.1-20 parts by weight of cobalt hydroxide.

The metal silicate or the organic silicate is added to remarkably improve the adhesion with base steel and give a high tensile stress. Specifically, metal silicate may be at least one selected from the group consisting of sodium silicate, potassium silicate, calcium silicate, magnesium silicate, manganese silicate and strontium silicate, and organic silicate may be tetraalkylorthosilicate and more specifically may be at least one selected from tetraethyl orthosilicate and tetramethyl orthosilicate.

The 10-50 parts by weight of metal silicate or organic silicate may be included. When a too small amount of metal silicate or organic silicate is included, a problem may occur that the adhesion of the base steel is inferior. When a too much amount of metal silicate or organic silicate is included, a problem may occur that corrosion resistance is inferior. Therefore, an addition amount of metal silicate or organic silicate may be controlled in the above-mentioned range. When metal silicate and organic silicate are included at the same time, the total amount thereof may be 10-50 parts by weight.

The inorganic nanoparticles form a ceramic layer having a low coefficient of thermal expansion when heat-treating the insulation film, thereby functioning to apply tensile stress to a material. Specifically, the inorganic nanoparticles may be at least one selected from alumina ($Al_2O_3$), silica ($SiO_2$), titania ($TiO_2$), zirconia ($ZrO_2$), yttrium oxide ($Y_2O_3$) and magnesium oxide (MgO).

20-70 parts by weight of the inorganic nanoparticles may be included. When a too small amount of the inorganic nanoparticles is included, the ceramic layer may not be formed, which may cause a problem that sufficient tensile stress may not be applied to the material. When a too much amount of the inorganic nanoparticles is included, the solid content ratio may increase, which may cause a problem that the quality of a surface of the grain-oriented electrical steel sheet deteriorates. Therefore, the addition amount of the inorganic nanoparticles may be controlled within the above-mentioned range.

An average particle diameter of the inorganic nanoparticles may be 1 nm to 100 nm. When the average particle diameter of the inorganic nanoparticles is too small, the specific surface area increases, and gelation of a solution proceeds rapidly, which may cause a problem that it is difficult to maintain properties of the initial solution. When the average particle diameter of the inorganic nanoparticles is too large, the specific surface area is reduced, which may cause a problem that the condensation reaction rate slows down. Therefore, the average particle diameter of the inorganic nanoparticles may be controlled within the above-mentioned range.

It is also possible to mix and use two or more kinds of inorganic nanoparticles having different particle diameters of inorganic nanoparticles. When the two or more kinds of inorganic nanoparticles having different particle diameters are mixed, the solution properties may be improved by synergistic action of the inorganic nanoparticles having different particle diameters. That is, the stability of the solution may be maintained for a long time by the inorganic nanoparticles having a relatively large particle diameter, and inorganic nanoparticles having a relatively small particle diameter are filled between the inorganic nanoparticles having the relatively large particle diameter, and thus the surface filling property may be improved and the insulation property may be also improved. Specifically, the inorganic nanoparticles having a particle diameter of 1 nm to less than 10 nm and inorganic nanoparticles having a particle diameter of 10 nm to 100 nm may be included. More specifically, the inorganic nanoparticles having the particle diameter of less than 1 nm to less than 10 nm, inorganic nanoparticles having a particle diameter of less than 10 nm to less than 30 nm, and inorganic nanoparticles having a particle diameter of 30 nm to 100 nm may be included.

Cobalt hydroxide ($Co(OH)_2$) serves to prevent gelation due to the mixing of the metal silicate or the organic silicate with the inorganic nanoparticles and to maintain stability. 0.1-20 parts by weight of cobalt hydroxide may be included. When the addition amount of cobalt hydroxide is too small, a problem may occur in that it is insufficient to maintain stability. When the addition amount of cobalt hydroxide is too large, the film property may be adversely affected. Therefore, the addition amount of cobalt hydroxide may be controlled within the above-mentioned range.

The insulation film composition may further include a solvent. The solvent serves to improve the stability, spreadability and workability of the insulation film composition. Specifically, the solvent may be water, ethyl alcohol, isopropyl alcohol, or butanol. 10-25 parts by weight of the solvent may be included. The stability, spreadability and workability are improved in the above-mentioned range.

The insulation film composition may further include metal phosphate. Metal of metal phosphate may be at least one selected from Mg, Al, Ca, Fe, Mn, Sr, Zr and Ba. Specifically, metal phosphate may be at least one of monobasic aluminum phosphate, monobasic magnesium phosphate and monobasic calcium phosphate.

Specifically, metal phosphate may be a compound by chemical reaction of metal hydroxide and phosphoric acid ($H_3PO_4$), and metal of metal hydroxide may be at least one selected from Mg, Al, Ca, Fe, Mn, Sr, Zr and Ba.

Specifically, metal phosphate may be composed of a compound in which metal atoms of metal hydroxide form a single bond, a double bond, or a triple bond through substitution reaction with phosphorus of phosphoric acid, and an amount of unreacted free phosphoric acid ($H_3PO_4$) is less than or equal to 35%.

Metal phosphate may be composed of a compound by chemical reaction of metal hydroxide and phosphoric acid ($H_3PO_4$), and a weight ratio of metal hydroxide to phosphoric acid may be expressed as 1:100 to 70:100.

When metal hydroxide is included exceeding the weight ratio of 70:100, the chemical reaction may not be completed to cause precipitate. When metal hydroxide is included less than the weight ratio of 1:100, since a problem may occur that corrosion resistance is inferior, it is limited to the above-mentioned range.

10-50 parts by weight of metal phosphate may be included.

According to another exemplary embodiment of the present invention, a method for forming an insulation film of a grain-oriented electrical steel sheet includes step (S10) of preparing the grain-oriented electrical steel sheet and an insulation film composition for the grain-oriented electrical steel sheet; step of (S20) applying the insulation film composition for the grain-oriented electrical steel sheet to a surface of the grain-oriented electrical steel sheet; step of (S30) heat-treating the grain-oriented electrical steel sheet coated with the insulation film composition for the grain-oriented electrical steel sheet; and step (S40) of obtaining the grain-oriented electrical steel sheet having the insulation film on its surface. At this time, the insulation film composition for the grain-oriented electrical steel sheet includes 10-50 parts by weight of metal silicate or organic silicate, 20-70 parts by weight of inorganic nanoparticles and 0.1-20 parts by weight of cobalt hydroxide.

This corresponds to a method for forming the insulation film on the surface of the grain-oriented electrical steel sheet using the insulation film composition for the grain-oriented electric steel sheet having the above-mentioned characteristics. Hereinafter, each step of the method for forming the insulation film of the grain-oriented electrical steel sheet will be described in more detail.

First, step (S10) prepares the grain-oriented electrical steel sheet and the insulation film composition for the grain-oriented electrical steel sheet.

The description of the insulation film composition for the grain-oriented electrical steel sheet is the same as described above and a repeated description is omitted.

The grain-oriented electrical steel sheet may include 2.0-4.0% of Si, 0.002% or less of C (excluding 0%) and 0.01-0.06% of Sb in weight %, and the remnant including Fe and other inevitable impurities.

Specifically, the method for forming the insulation film of the grain-oriented electrical steel sheet includes providing a slab including 2.0-4.0% Si, 0.1-0.4% C, 0.01-0.06% Sb, and the remnant including Fe and other inevitable impurities; re-heating the slab; hot-rolling the slab to form a hot-rolled steel sheet; subjecting the hot-rolled steel sheet to hot-rolled annealing; cold-rolling the hot-rolled steel sheet subjected to hot-rolled annealing; decarburization annealing the cold-rolled steel sheet; cold-rolling the steel sheet on which decarburization annealing is completed; and finally annealing the completely cold-rolled steel sheet.

First, the slab including 2.0% to 4.0% of Si, 0.1% to 0.4% of C, and 0.01% to 0.06% of Sb in weight % and the remnant including Fe and other inevitable impurities is provided. The reason for limiting the composition is as follows.

Silicon (Si) reduces the magnetic anisotropy of the electrical steel sheet and increases the resistivity to improve the iron loss. When the Si content is less than 2.0 wt %, the iron loss is inferior and when the Si content is more than 4.0 wt %, the brittleness increases. Therefore, the Si content in the slab and the grain-oriented electrical steel sheet after a final annealing step may be 2.0-4.0 wt %.

Carbon (C) requires a process of C in a center portion to escape to a surface layer in order to diffuse Goss grains in the surface layer to the center portion during intermediate decarburization annealing and final annealing, and thus the C content in the slab may be 0.1-0.4 wt %. Further, an amount of carbon in the grain-oriented electrical steel sheet after the final annealing step may be 0.0020 wt % or less (excluding 0 wt %).

Antimony (Sb) has an effect of increasing a fraction of grains having a {110}<001> orientation in a recrystallization texture structure during intermediate decarburization annealing and final annealing. Also, since Sb obtains an effect of suppressing the oxidation reaction upon decarburization annealing, it is possible to further raise the temperature upon decarburization annealing and suppress the grain growth by being precipitated from grain boundaries, and thus an advantage of reducing a recrystallization particle diameter may be obtained. Therefore, an effect of refinement of a magnetic domain due to refinement of recrystallization may be obtained. When the Sb content is less than 0.01 wt %, the iron loss is inferior, and when the Sb content is more than 0.06 wt %, it is difficult to control the grain size. Therefore, the Sb content in the slab and the grain-oriented electrical steel sheet after the final annealing step may be 0.01-0.06 wt %.

Next, the slab of the above composition is re-heated. The slab re-heating temperature may be between 1100° C. and 1350° C. In the method for forming the grain-oriented electrical steel sheet according to an exemplary embodiment of the present invention, since the carbon content in the slab is larger than that of the conventional slab, a hot-rolled structure is not coarsened even when the slab re-heating temperature is high, and the slab is re-heated at a higher temperature than usual, and thus it is possible to obtain an advantage in hot rolling.

Next, the hot-rolled steel sheet is formed by subjecting the completely re-heated slab to hot-rolling. At this time, a thickness of the hot-rolled steel sheet may be 2 mm to 5 mm.

Next, the hot-rolled steel sheet is subjected to hot-rolled annealing. At this time, hot-rolled annealing may be performed at a temperature of 850° C. to 1000° C. Also, at this time, the dew point temperature may be 50° C. to 70° C. There is an effect of diffusing the Goss grains of the surface layer to the center portion since decarburization annealing is easy at the temperature of the above-mentioned range and the dew point temperature.

Next, the hot-rolled steel sheet subjected to hot-rolled annealing is cold-rolled. Cold-rolling may be performed at a reduction ratio of 50% to 70%. When cold-rolling is performed at the reduction ratio in the above-mentioned range, many Goss textures may be formed in the surface layer. More specifically, the reduction ratio may be 55% to 65% upon cold-rolling.

Next, the cold-rolled steel sheet is subjected to decarburization annealing. Decarburization annealing may be performed at a dew point temperature of 40° C. to 60° C. in an austenite single phase region or a region where a composite phase of ferrite and austenite exists. At this time, the temperature range may be 750° C. to 950° C. Further, the atmosphere may be a mixed gas atmosphere of hydrogen and nitrogen. A decarbonization amount may be 0.0300 wt % to 0.0600 wt % upon decarburization annealing.

In such a decarburization annealing process, the grain size of the surface of the electric steel sheet coarsely grows, but grains inside the electric steel sheet remain as fine structures. The size of surface ferrite grains may be from 150 µm to 250 µm after decarburization annealing.

In an exemplary embodiment of the present invention, the grain-oriented electrical steel sheet may be formed without using a grain growth inhibitor, and the Goss is grown through a decarburization process, and thus carbonitriding annealing for forming a separate inhibitor may be omitted.

Next, the steel sheet on which decarburization annealing is completed is cold-rolled.

It is generally known that cold-rolling is performed once at a high reduction ratio close to 90%. This is because only the Goss grains in primary recrystallization grains create an environment favorable for the grain growth. Meanwhile, the method for forming the grain-oriented electrical steel sheet according to an exemplary embodiment of the present invention internally diffuses the Goss grains in the surface layer caused by decarburization annealing and cold-rolling without using abnormal grain growth of Goss orientation grains, and thus it is advantageous to distribute and form a plurality of Goss orientation grains on the surface layer. Therefore, cold-rolling is performed twice or more at a reduction ratio of 50% to 70%. Decarburization annealing and cold-rolling may be repeated twice or more.

Next, the completely cold-rolled steel sheet is finally annealed.

In the method for forming the grain-oriented electrical steel sheet according to an exemplary embodiment of the present invention, unlike the conventional batch method, final annealing may be performed successively after cold-rolling. That is, final annealing may be performed quickly. Specifically, final annealing may be performed for 1 minute to 30 minutes. The reason why final annealing may be performed continuously is that unlike the conventional abnormal grain growth technique, Goss single crystals are formed to induce normal grain growth.

A final annealing step may be performed by divided into a first step of annealing at a temperature of 900° C. to 1000° C. and a dew point temperature of 55° C. to 65° C., and a second step of annealing at a temperature of 1000° C. to 1200° C. and an atmosphere of at least 75 vol % of Hz. By performing final annealing in two steps, it is advantageous to improve the magnetic flux density by improving a degree of integration of Goss.

The grain-oriented electrical steel sheet formed by using this method may have a volume fraction of 90% or more of grains having an orientation within 15 degrees from the {110}<001> orientation. Since the volume fraction of the grains having the orientation within 15 degrees from the {110}<001> orientation is high, the grain-oriented electrical steel sheet excellent in magnetic properties may be obtained.

Also, the grains having the orientation within 15 degrees from the {110}<001> orientation, a ratio of the grains having a size of 30 µm to 1000 µm may be 80% or more. By limiting the size of the grains having the orientation within 15 degrees from the {110}<001> orientation to a specific range, the grain-oriented electrical steel sheet excellent in magnetic properties may be obtained.

When it comes back to the method for forming the insulation film of the grain-oriented electrical steel sheet, step S20 applies the insulation film composition for the grain-oriented electrical steel sheet to the surface of the grain-oriented electrical steel sheet. The insulation film composition for the grain-oriented electrical steel sheet may be coated in a range of 0.5 g/m$^2$ to 7 g/m$^2$ per one surface of the grain-oriented electrical steel sheet. If the insulation film composition for the grain-oriented electrical steel sheet is coated too much, an occupying ratio is lowered, and thus if the finally obtained grain-oriented electrical steel sheet is formed as a product such as a transformer, there may occur a problem in that characteristics of the product are inferior. When the insulation film composition for the grain-oriented electrical steel sheet is coated too little, there is a problem in that the insulation property expressed by the insulation film is inferior. Therefore, the insulation film composition for the grain-oriented electrical steel sheet may be applied in an amount within the above-mentioned range.

Step S30 heat-treats the grain-oriented electrical steel sheet coated with the insulation film composition for the grain-oriented electrical steel sheet. At this time, heat treatment may be performed in a temperature range of 250° C. to 950° C. If the heat treatment temperature is too low, drying of the insulation film composition for the grain-oriented electrical steel sheet becomes insufficient and there may occur a problem in that it is difficult to ensure characteristics of the insulation film. If the heat treatment temperature is too high, a stain defect may occur in the insulation film. Therefore, the heat treatment temperature may be controlled within the above-mentioned range.

A grain-oriented electrical steel sheet according to another exemplary embodiment of the present invention includes the grain-oriented electrical steel sheet; and an insulation film formed on a surface of the grain-oriented electrical steel sheet. In this regard, the insulation film includes 10-50 parts by weight of metal silicate or organic silicate, 20-70 parts by weight of inorganic nanoparticles and 0.1-20 parts by weight of cobalt hydroxide.

The descriptions of the insulation film composition for the grain-oriented electric steel sheet and the grain-oriented electric steel sheet are the same as described above, and thus repeated descriptions are omitted.

The insulation film composition for the grain-oriented electric steel sheet according to an exemplary embodiment of the present invention includes 10-50 parts by weight of metal phosphate, 5-30 parts by weight of inorganic nanoparticles having a particle diameter of 1 nm to less than 10 nm, 10-40 parts by weight of inorganic nanoparticles having a particle diameter of 10 to 100 nm and 0.1-20 parts by weight of chromium oxide.

Metal phosphate is added to remarkably improve the adhesion with base steel and give a high tensile stress. Specifically, metal phosphate may include at least one metal selected from Mg, Al, Ca, Fe, Mn, Sr, Zr and Ba.

Specifically, metal phosphate may be at least one of monobasic aluminum phosphate, monobasic magnesium phosphate and monobasic calcium phosphate.

Specifically, metal phosphate may be a compound by chemical reaction of metal hydroxide and phosphoric acid ($H_3PO_4$), and metal of metal hydroxide may be at least one selected from Mg, Al, Ca, Fe, Mn, Sr, Zr and Ba.

Specifically, metal phosphate may be composed of a compound in which metal atoms of metal hydroxide form a single bond, a double bond, or a triple bond through substitution reaction with phosphorus of phosphoric acid, and an amount of unreacted free phosphoric acid ($H_3PO_4$) is less than or equal to 35%.

Metal phosphate may be composed of a compound by chemical reaction of metal hydroxide and phosphoric acid ($H_3PO_4$), and a weight ratio of metal hydroxide to phosphoric acid may be expressed as 1:100 to 70:100.

When metal hydroxide is included exceeding the weight ratio of 70:100, the chemical reaction may not be completed to cause precipitate. When metal hydroxide is included less than the weight ratio of 1:100, since a problem may occur that corrosion resistance is inferior, it is limited to the above-mentioned range.

10-50 parts by weight of metal phosphate may be included.

If an amount of metal phosphate is too small, since the adhesion of a coating agent may be lowered, there may occur a problem in that the film tension and adhesion deteriorate. If the amount of metal phosphate is too much, the insulation properties may deteriorate. Therefore, the addition amount of metal phosphate may be controlled to the above-mentioned range.

The inorganic nanoparticles form a ceramic layer having a low coefficient of thermal expansion when heat-treating the insulation film, thereby functioning to apply tensile stress to a material. Specifically, the inorganic nanoparticles may be at least one selected from alumina ($Al_2O_3$), silica ($SiO_2$), titania ($TiO_2$), zirconia ($ZrO_2$), yttrium oxide ($Y_2O_3$) and magnesium oxide (MgO).

The inorganic nanoparticles are used by mixing two or more inorganic nanoparticles having different particle diameters. When the two or more kinds of inorganic nanoparticles having different particle diameters are mixed, the solution properties may be improved by synergistic action of the inorganic nanoparticles having different particle diameters.

That is, the stability of the solution may be maintained for a long time by the inorganic nanoparticles having a relatively large particle diameter, and inorganic nanoparticles having a relatively small particle diameter are filled between the inorganic nanoparticles having the relatively large particle diameter, and thus the surface filling property may be improved and the insulation property may be also improved. Specifically, inorganic nanoparticles having a particle diameter of 1 nm to less than 10 nm and inorganic nanoparticles having a particle diameter of 10 nm to 100 nm may be included.

At this time, 5-30 parts by weight of inorganic nanoparticles having a particle diameter of 10 nm to 100 nm and 10-40 parts by weight of inorganic nanoparticles having a particle diameter of 10 nm to 100 nm may be included. The stability of the solution may be maintained for a long time in the above-mentioned range, the surface filling property may be improved, and the insulation property may be also improved.

More specifically, two or more kinds of inorganic nanoparticles having different particle diameters may be mixed, and the inorganic nanoparticles having a particle diameter of 10 nm to 100 nm may include 5-20 parts by weight of inorganic nanoparticles having a particle diameter of 10 nm to less than 30 nm and 5-20 parts by weight of inorganic nanoparticles having a particle diameter of 30 nm to less than 100 nm. The stability of the solution may be maintained for a long time in the above-mentioned range, the surface filling property may be improved, and the insulation property may be also improved.

Chromium oxide prevents gelation due to mixing of metal phosphate and inorganic nanoparticles and maintains stability. 0.1-20 parts by weight of chromium oxide may be included. If an addition amount of chromium oxide is too small, there may arise a problem that it is insufficient to maintain stability. If the addition amount of chromium oxide is too large, the film properties may be adversely affected. Therefore, the addition amount of chromium oxide may be controlled within the above-mentioned range. Chromium oxide may be specifically at least one selected from chromium trioxide, chromium oxide, and chromium oxide.

The insulation film composition may further include a solvent. The solvent serves to improve the stability, spreadability and workability of the insulation film composition. Specifically, the solvent may be water, ethyl alcohol, isopropyl alcohol, or butanol. 10-25 parts by weight of the solvent may be included. The stability, spreadability and workability are improved in the above-mentioned range.

According to another exemplary embodiment of the present invention, a method for forming an insulation film of a grain-oriented electrical steel sheet includes step (S10) of preparing the grain-oriented electrical steel sheet and an insulation film composition for the grain-oriented electrical steel sheet; step of (S20) applying the insulation film composition for the grain-oriented electrical steel sheet to a surface of the grain-oriented electrical steel sheet; step of (S30) heat-treating the grain-oriented electrical steel sheet coated with the insulation film composition for the grain-oriented electrical steel sheet; and step (S40) of obtaining the grain-oriented electrical steel sheet having the insulation film on its surface. In this regard, the insulation film composition for the grain-oriented electrical steel sheet includes 10-50 parts by weight of metal phosphate, 5-30 parts by weight of inorganic nanoparticles having a particle diameter of 1 nm to less than 10 nm, 10-40 parts by weight of inorganic nanoparticles having a particle diameter of 10 to 100 nm, and 0.1-20 parts by weight of chromium oxide.

This corresponds to a method for forming the insulation film on the surface of the grain-oriented electrical steel sheet using the insulation film composition for the grain-oriented electric steel sheet having the above-mentioned characteristics. Hereinafter, each step of the method for forming the insulation film of the grain-oriented electrical steel sheet will be described in more detail.

First, step (S10) prepares the grain-oriented electrical steel sheet and the insulation film composition for the grain-oriented electrical steel sheet.

The description of the insulation film composition for the grain-oriented electrical steel sheet is the same as described above and a repeated description is omitted.

The grain-oriented electrical steel sheet may contain 2.0-4.0% of Si, 0.002% or less of C (excluding 0%) and 0.01-0.06% of Sb in weight %, and the remnant may be Fe and other inevitable impurities.

Specifically, the method for forming the insulation film of the grain-oriented electrical steel sheet includes providing a slab including 2.0-4.0% Si, 0.1-0.4% C, 0.01-0.06% Sb, and the remnant of Fe and other inevitable impurities; re-heating the slab; hot-rolling the slab to form a hot-rolled steel sheet; subjecting the hot-rolled steel sheet to hot-rolled annealing; cold-rolling the hot-rolled steel sheet subjected to hot-rolled annealing; decarburization annealing the cold-rolled steel sheet; cold-rolling the steel sheet on which decarburization annealing is completed; and finally annealing the completely cold-rolled steel sheet.

First, the slab including 2.0% to 4.0% of Si, 0.1% to 0.4% of C, and 0.01% to 0.06% of Sb in weight % and the remnant including Fe and other inevitable impurities is provided. The reason for limiting the composition is as follows.

Silicon (Si) reduces the magnetic anisotropy of the electrical steel sheet and increases the resistivity to improve the iron loss. When the Si content is less than 2.0 wt %, the iron loss is inferior and when the SI content is more than 4.0 wt %, the brittleness increases. Therefore, the Si content in the slab and the grain-oriented electrical steel sheet after a final annealing step may be 2.0-4.0 wt %.

Carbon (C) requires a process of C in a center portion to escape to a surface layer in order to diffuse Goss grains in the surface layer to the center portion during intermediate decarburization annealing and final annealing, and thus the C content in the slab may be 0.1-0.4 wt %. Further, an amount of carbon in the grain-oriented electrical steel sheet after the final annealing step may be 0.0020 wt % or less (excluding 0 wt %).

Antimony (Sb) has an effect of increasing a fraction of grains having a {110}<001> orientation in a recrystallization texture structure during intermediate decarburization annealing and final annealing. Also, since Sb obtains an effect of suppressing the oxidation reaction upon decarburization annealing, it is possible to further raise the temperature upon decarburization annealing and suppress the grain growth by being precipitated from grain boundaries, and thus an advantage of reducing a recrystallization particle diameter may be obtained. Therefore, an effect of refinement of a magnetic domain due to refinement of recrystallization may be obtained. When the Sb content is less than 0.01 wt %, the iron loss is inferior, and when the Sb content is more than 0.06 wt %, it is difficult to control the grain size. Therefore, the Sb content in the slab and the grain-oriented electrical steel sheet after the final annealing step may be 0.01-0.06 wt %.

Next, the slab of the above composition is re-heated. The slab re-heating temperature may be between 1100° C. and 1350° C. In the method for forming the grain-oriented electrical steel sheet according to an exemplary embodiment of the present invention, since the carbon content in the slab is larger than that of the conventional slab, a hot-rolled structure is not coarsened even when the slab re-heating temperature is high, and the slab is re-heated at a higher temperature than usual, and thus it is possible to obtain an advantage in hot rolling.

Next, the hot-rolled steel sheet is formed by subjecting the completely re-heated slab to hot-rolling. At this time, a thickness of the hot-rolled steel sheet may be 2 mm to 5 mm.

Next, the hot-rolled steel sheet is subjected to hot-rolled annealing. At this time, hot-rolled annealing may be performed at a temperature of 850° C. to 1000° C. Also, at this time, the dew point temperature may be 50° C. to 70° C. There is an effect of diffusing the Goss grains of the surface layer to the center portion since decarburization annealing is easy at the temperature of the above-mentioned range and the dew point temperature.

Next, the hot-rolled steel sheet subjected to hot-rolled annealing is cold-rolled. Cold-rolling may be performed at a reduction ratio of 50% to 70%. When cold-rolling is performed at the reduction ratio in the above-mentioned range, many Goss textures may be formed in the surface layer. More specifically, the reduction ratio may be 55% to 65% upon cold-rolling.

Next, the cold-rolled steel sheet is subjected to decarburization annealing. Decarburization annealing may be performed at a dew point temperature of 40° C. to 60° C. in an austenite single phase region or a region where a composite phase of ferrite and austenite exists. At this time, the temperature range may be 750° C. to 950° C. Further, the atmosphere may be a mixed gas atmosphere of hydrogen and nitrogen. A decarbonization amount may be 0.0300 wt % to 0.0600 wt % upon decarburization annealing.

In such a decarburization annealing process, the grain size of the surface of the electric steel sheet coarsely grows, but grains inside the electric steel sheet remain as fine structures. The size of surface ferrite grains may be from 150 μm to 250 μm after decarburization annealing.

In an exemplary embodiment of the present invention, the grain-oriented electrical steel sheet may be formed without using a grain growth inhibitor, and the Goss is grown through a decarburization process, and thus carbonitriding annealing for forming a separate inhibitor may be omitted.

Next, the steel sheet on which decarburization annealing is completed is cold-rolled.

It is generally known that cold-rolling is performed once at a high reduction ratio close to 90%. This is because only the Goss grains in primary recrystallization grains create an environment favorable for the grain growth. Meanwhile, the method for forming the grain-oriented electrical steel sheet according to an exemplary embodiment of the present invention internally diffuses the Goss grains in the surface layer caused by decarburization annealing and cold-rolling without using abnormal grain growth of Goss orientation grains, and thus it is advantageous to distribute and form a plurality of Goss orientation grains on the surface layer. Therefore, cold-rolling is performed twice or more at a reduction ratio of 50% to 70%. Decarburization annealing and cold-rolling may be repeated twice or more.

Next, the completely cold-rolled steel sheet is finally annealed.

In the method for forming the grain-oriented electrical steel sheet according to an exemplary embodiment of the present invention, unlike the conventional batch method, final annealing may be performed successively after cold-rolling. That is, final annealing may be performed quickly. Specifically, final annealing may be performed for 1 minute to 30 minutes. The reason why final annealing may be performed continuously is that unlike the conventional abnormal grain growth technique, Goss single crystals are formed to induce normal grain growth.

A final annealing step may be performed by divided into a first step of annealing at a temperature of 900° C. to 1000° C. and a dew point temperature of 55° C. to 65° C., and a second step of annealing at a temperature of 1000° C. to 1200° C. and an atmosphere of at least 75 vol % of Hz. By performing final annealing in two steps, it is advantageous to improve the magnetic flux density by improving a degree of integration of Goss.

The grain-oriented electrical steel sheet formed by using this method may have a volume fraction of 90% or more of grains having an orientation within 15 degrees from the {110}<001> orientation. Since the volume fraction of the grains having the orientation within 15 degrees from the {110}<001> orientation is high, the grain-oriented electrical steel sheet excellent in magnetic properties may be obtained.

Also, the grains having the orientation within 15 degrees from the {110}<001> orientation, a ratio of the grains having a size of 30 μm to 1000 μm may be 80% or more. By limiting the size of the grains having the orientation within 15 degrees from the {110}<001> orientation to a specific range, the grain-oriented electrical steel sheet excellent in magnetic properties may be obtained.

When it comes back to the method for forming the insulation film of the grain-oriented electrical steel sheet, step S20 applies the insulation film composition for the grain-oriented electrical steel sheet to the surface of the grain-oriented electrical steel sheet. The insulation film composition for the grain-oriented electrical steel sheet may be applied in a range of 0.5 g/m$^2$ to 7 g/m$^2$ per one surface of the grain-oriented electrical steel sheet. If the insulation film composition for the grain-oriented electrical steel sheet is coated too much, an occupying ratio is lowered, and thus if the finally obtained grain-oriented electrical steel sheet is formed as a product such as a transformer, there may occur a problem in that characteristics of the product are inferior. When the insulation film composition for the grain-oriented electrical steel sheet is coated too little, there is a problem in that the insulation property expressed by the insulation film is inferior. Therefore, the insulation film composition for the grain-oriented electrical steel sheet may be applied in an amount within the above-mentioned range.

Step S30 heat-treats the grain-oriented electrical steel sheet coated with the insulation film composition for the grain-oriented electrical steel sheet. At this time, heat treatment may be performed in a temperature range of 250° C. to 950° C. If the heat treatment temperature is too low, drying of the insulation film composition for the grain-oriented electrical steel sheet becomes insufficient and there may occur a problem in that it is difficult to ensure characteristics of the insulation film. If the heat treatment temperature is too high, a stain defect may occur in the insulation film. Therefore, the heat treatment temperature may be controlled within the above-mentioned range.

A grain-oriented electrical steel sheet according to another exemplary embodiment of the present invention includes the grain-oriented electrical steel sheet; and an insulation film formed on a surface of the grain-oriented electrical steel sheet. In this regard, the insulation film includes 10-50 parts by weight of metal phosphate, 5-30 parts by weight of inorganic nanoparticles having a particle diameter of 1 nm to less than 10 nm, 10-40 parts by weight of inorganic nanoparticles having a particle diameter of 10 to 100 nm and 0.1-20 parts by weight of chromium oxide.

The descriptions of the insulation film composition for the grain-oriented electric steel sheet and the grain-oriented electric steel sheet are the same as described above, and thus repeated descriptions are omitted.

Hereinafter, preferred embodiments of the present invention and comparative examples will be described. However, the following embodiments are only preferred embodiments of the present invention and do not limit the scope of the present invention.

Example 1

A slab including 2.0% of Si, 0.020% of C, and 0.05% of Sb in weight %, and the remnant including Fe and other inevitable impurities is heated at a temperature of 1150° C. for 220 minutes and then hot-rolled at a thickness of 3 mm, subjected to hot-rolled annealing at an annealing temperature of 900° C. and a dew point temperature of 60° C. for 150 seconds, cooled and then pickled, and then cold-rolled at a reduction ratio of 60%.

The cold-rolled sheet is again subjected to decarburization annealing in a wet mixed gas atmosphere of hydrogen and nitrogen (a dew point temperature of 60° C.) for 100 seconds at a temperature of 900° C. Thereafter, the cold-rolled sheet is secondarily cold-rolled at a reduction ratio of 60%, and is subjected to secondary decarburization annealing under the same conditions for 45 seconds. The cold-rolled sheet is again thirdly cold-annealed at a reduction ratio of 60% and subjected to primary final annealing for 45 seconds in the wet mixed gas atmosphere of hydrogen and nitrogen (a dew point temperature of 60° C.) at 950° C. for 45 seconds, and then subjected to secondary final annealing for 2 minutes in a hydrogen atmosphere at 1080° C. At this time, during final annealing, a temperature rise rate of a temperature rise period up to 700° C. is 150° C./sec. A thickness of the formed grain-oriented electrical steel sheet is 0.27 mm, and a sample of 300×60 mm is prepared.

As a result of analyzing the grains of the formed grain-oriented electrical steel sheet, the volume fraction of the grains having an orientation within 15 degrees from the {110}<001> orientation is 94% and a ratio of the grains of a size of 30 um or more and less than 1000 um among the grains having the orientation within 15 degrees from the {110}<001> orientation is 83%.

The insulation film composition is formed by sufficiently mixing 35 parts by weight of alumina nanoparticles having an average particle diameter of 7 nm, 40 parts by weight of sodium silicate, 5 parts by weight of cobalt hydroxide and 20 parts by weight of water.

The insulation film composition is applied to the surface of the grain-oriented electrical steel sheet on which final annealing is completed in an amount of 4.2 g/m$^2$ and heat treatment is performed at 850° C. for 30 seconds to obtain the grain-oriented electrical steel sheet on which the insulation film is formed. A thickness of the insulation film is 2 μm.

The magnetic flux density, iron loss, insulation film tension, and corrosion resistance of the grain-oriented electric steel sheet having the insulation film formed thereon in Example 1 is evaluated using the following method and summarized in the following Table 1.

Example 2

A grain-oriented electrical steel sheet having an insulation film formed thereon is formed in the same manner as in Example 1 except that magnesium silicate is used instead of sodium silicate.

The magnetic flux density, iron loss, insulation film tension, and corrosion resistance of the grain-oriented electric steel sheet having the insulation film formed thereon in Example 2 is evaluated using the following method and summarized in the following Table 1.

Example 3

A grain-oriented electrical steel sheet having an insulation film formed thereon is formed in the same manner as in Example 1 except that calcium silicate is used instead of sodium silicate.

The magnetic flux density, iron loss, insulation film tension, and corrosion resistance of the grain-oriented electric steel sheet having the insulation film formed thereon in Example 3 is evaluated using the following method and summarized in the following Table 1.

Example 4

A grain-oriented electrical steel sheet having an insulation film formed thereon is formed in the same manner as in Example 1 except that manganese silicate is used instead of sodium silicate.

The magnetic flux density, iron loss, insulation film tension, and corrosion resistance of the grain-oriented electric steel sheet having the insulation film formed thereon in Example 4 is evaluated using the following method and summarized in the following Table 1.

Example 5

A grain-oriented electrical steel sheet having an insulation film formed thereon is formed in the same manner as in Example 1 except that strontium silicate is used instead of sodium silicate.

The magnetic flux density, iron loss, insulation film tension, and corrosion resistance of the grain-oriented electric steel sheet having the insulation film formed thereon in Example 5 is evaluated using the following method and summarized in the following Table 1.

Experimental Example 1: Method for Measuring Iron Loss

The power loss observed when a magnetic field of frequency 50 Hz is magnetized by alternating current up to 1.7 Tesla.

Experimental Example 2: Method for Measuring Magnetic Flux

When an electric current of 800 A/m is flown through a coil wound around an electric steel sheet, a value of magnetic flux density flowing through the electric steel sheet is measured.

Experimental Example 3: Method of Measuring Insulation

According to the ASTM A717 international standard, a value of receiving current is measured when flowing through a voltage of 0.5 V and a current of 1.0 A under a 300 PSI pressure using a Franklin measuring device.

Experimental Example 4: Method of Measuring Film Tension

An insulation film is warped in one direction due to addition of tensile stress by the insulation film formed on a surface and a degree of such warping is measured to evaluate the film tension by the insulation film.

Experimental Example 5: Method of Measuring Corrosion Resistance

It is evaluated whether a sample is rusted in a 5% by weight, 35% ° C., NaCl solution for 8 hours. In this experiment, it is indicated that the rust occurrence area is excellent when the area is less than or equal to 5%, good when the area is less than or equal to 20%, a little bad when the area is between 20% and 50%, and bad when the area is equal to or more than 50%.

TABLE 1

|  | silicate | $B_{10}$(Tesla) | $W_{17/50}$(W/kg) | Insulation (mA) | Film tension (Mpa) | Corrosion resistance |
| --- | --- | --- | --- | --- | --- | --- |
| Example 1 | sodium silicate | 1.91 | 1.03 | 55 | 4.5 | good |
| Example 2 | magnesium silicate | 1.91 | 1.05 | 35 | 3.4 | excellent |
| Example 3 | calcium silicate | 1.90 | 1.08 | 82 | 2.9 | good |
| Example 4 | manganese silicate | 1.90 | 1.11 | 119 | 2.8 | excellent |
| Example 5 | strontium silicate | 1.90 | 1.20 | 105 | 2.7 | good |

As may be seen from Table 1, it may be seen that the grain-oriented electrical steel sheet having the insulation film formed thereon according to an example of the present invention has excellent electrical characteristics and excellent insulating properties, film tensions and corrosion resistance.

Example 6

A grain-oriented electrical steel sheet having an insulation film formed thereon is formed in the same manner as in Example 1 except that silica nanoparticles with an average particle diameter of 5 nm are used instead of alumina nanoparticles.

The magnetic flux density, iron loss, insulation film tension, and corrosion resistance of the grain-oriented electric steel sheet having the insulation film formed thereon in Example 6 is evaluated using the following method and summarized in the following Table 2.

Example 7

A grain-oriented electrical steel sheet having an insulation film formed thereon is formed in the same manner as in Example 1 except that silica nanoparticles with an average particle diameter of 12 nm are used instead of alumina nanoparticles.

The magnetic flux density, iron loss, insulation film tension, and corrosion resistance of the grain-oriented electric steel sheet having the insulation film formed thereon in Example 7 is evaluated using the following method and summarized in the following Table 2.

Example 8

A grain-oriented electrical steel sheet having an insulation film formed thereon is formed in the same manner as in Example 1 except that silica nanoparticles with an average particle diameter of 50 nm are used instead of alumina nanoparticles.

The magnetic flux density, iron loss, insulation film tension, and corrosion resistance of the grain-oriented electric steel sheet having the insulation film formed thereon in Example 8 is evaluated using the following method and summarized in the following Table 2.

Example 9

A grain-oriented electrical steel sheet having an insulation film formed thereon is formed in the same manner as in Example 1 except that 15 parts by weight of silica nanoparticles with an average particle diameter of 5 nm and 20 parts by weight of silica nanoparticles with an average particle diameter of 15 nm are used instead of alumina nanoparticles.

The magnetic flux density, iron loss, insulation film tension, and corrosion resistance of the grain-oriented electric steel sheet having the insulation film formed thereon in Example 9 is evaluated using the following method and summarized in the following Table 2.

Example 10

A grain-oriented electrical steel sheet having an insulation film formed thereon is formed in the same manner as in Example 1 except that 10 parts by weight of silica nanoparticles with an average particle diameter of 5 nm, 10 parts by weight of silica nanoparticles with an average particle diameter of 25 nm, and 15 parts by weight of silica nanoparticles with an average particle diameter of 40 nm are used instead of alumina nanoparticles.

The magnetic flux density, iron loss, insulation film tension, and corrosion resistance of the grain-oriented electric steel sheet having the insulation film formed thereon in Example 10 is evaluated using the following method and summarized in the following Table 2.

As may be seen from Table 2, in Examples 9 and 10 in which two or more kinds of silica nanoparticles having different particle diameters are mixed and used, it is observed that the film tensions and insulation are better and the corrosion resistance is also improved.

Example 11

A slab including 2.0% of Si, 0.20% of C, and 0.05% of Sb in weight %, and the remnant including Fe and other inevitable impurities is heated at a temperature of 1150° C. for 220 minutes and then hot-rolled at a thickness of 3 mm, subjected to hot-rolled annealing at an annealing temperature of 900° C. and a dew point temperature of 60° C. for 150 seconds, cooled and then pickled, and then cold-rolled at a reduction ratio of 60%.

The cold-rolled sheet is again subjected to decarburization annealing in a wet mixed gas atmosphere of hydrogen and nitrogen (a dew point temperature of 60° C.) for 100 seconds at a temperature of 900° C. Thereafter, the cold-rolled sheet is secondarily cold-rolled at a reduction ratio of 60%, and is subjected to secondary decarburization annealing under the same conditions for 45 seconds. The cold-rolled sheet is again thirdly cold-annealed at a reduction ratio of 60% and subjected to primary final annealing for 45 seconds in the wet mixed gas atmosphere of hydrogen and nitrogen (a dew point temperature of 60° C.) at 950° C., and then subjected to secondary final annealing for 2 minutes in a hydrogen atmosphere at 1080° C. At this time, during final annealing, a temperature rise rate of a temperature rise period up to 700° C. is 150° C./sec. A thickness of the formed grain-oriented electrical steel sheet is 0.27 mm, and a sample of 300×60 mm is prepared.

As a result of analyzing the grains of the formed grain-oriented electrical steel sheet, the volume fraction of the grains having an orientation within 15 degrees from the {110}<001> orientation is 94% and a ratio of the grains of a size of 30 um or more and less than 1000 um among the grains having the orientation within 15 degrees from the {110}<001> orientation is 83%.

The insulation film composition is formed by sufficiently mixing 15 parts by weight of silica nanoparticles having an average particle diameter of 5 nm, 20 parts by weight of silica nanoparticles having an average particle diameter of 15 nm, 40 parts by weight of aluminum phosphate, 5 parts by weight of chromium trioxide and 20 parts by weight of water.

The insulation film composition is applied to the surface of the grain-oriented electrical steel sheet on which final annealing is completed in an amount of 4.2 g/m² and heat treatment is performed at 850° C. for 30 seconds to obtain

TABLE 2

|  | silica nanoparticle(parts by weight) | $B_{10}$(Tesla) | $W_{17/50}$(W/kg) | Insulation (mA) | Film tension | Corrosion resistance |
|---|---|---|---|---|---|---|
| Example 6 | 5 nm (35 parts by weight) | 1.91 | 1.05 | 154 | 0.33 | good |
| Example 7 | 12 nm (35 parts by weight) | 1.90 | 1.08 | 168 | 0.30 | good |
| Example 8 | 50 nm (35 parts by weight) | 1.89 | 1.11 | 280 | 0.25 | average |
| Example 9 | 5 nm (15 parts by weight) + 15 nm (20 parts by weight) | 1.91 | 0.97 | 75 | 0.45 | excellent |
| Example 10 | 5 nm (10 parts by weight) + 25 nm (10 parts by weight) + 40 nm (15 parts by weight) | 1.90 | 0.95 | 10 | 0.69 | excellent | the grain-oriented electrical steel sheet on which the insulation film is formed. A thickness of the insulation film is 2 μm.

The magnetic flux density, iron loss, insulation film tension, and corrosion resistance of the grain-oriented electric steel sheet having the insulation film formed thereon in Example 11 is evaluated using the following method and summarized in the following Table 3.

Example 12

A grain-oriented electrical steel sheet having an insulation film formed thereon is formed in the same manner as in Example 11 except that 10 parts by weight of silica nanoparticles having an average particle diameter of 5 nm, 10 parts by weight of silica nanoparticles having an average particle diameter of 25 nm and 15 parts by weight of silica nanoparticles having an average particle diameter of 40 nm are used.

The magnetic flux density, iron loss, insulation film tension, and corrosion resistance of the grain-oriented electric steel sheet having the insulation film formed thereon in Example 12 is evaluated using the following method and summarized in the following Table 3.

Example 13

A grain-oriented electrical steel sheet having an insulation film formed thereon is formed in the same manner as in Example 11 except that 5 parts by weight of silica nanoparticles having an average particle diameter of 5 nm, 10 parts by weight of silica nanoparticles having an average particle diameter of 12 nm and 10 parts by weight of silica nanoparticles having an average particle diameter of 25 nm are used.

The magnetic flux density, iron loss, insulation film tension, and corrosion resistance of the grain-oriented electric steel sheet having the insulation film formed thereon in Example 13 is evaluated using the following method and summarized in the following Table 3.

Comparative Example 1

A grain-oriented electrical steel sheet having an insulation film formed thereon is formed in the same manner as in Example 11 except that 35 parts by weight of silica nanoparticles having an average particle diameter of 5 nm are used.

The magnetic flux density, iron loss, insulation film tension, and corrosion resistance of the grain-oriented electric steel sheet having the insulation film formed thereon in Comparative Example 1 is evaluated using the following method and summarized in the following Table 3.

Comparative Example 2

A grain-oriented electrical steel sheet having an insulation film formed thereon is formed in the same manner as in Example 11 except that 35 parts by weight of silica nanoparticles having an average particle diameter of 12 nm are used.

The magnetic flux density, iron loss, insulation film tension, and corrosion resistance of the grain-oriented electric steel sheet having the insulation film formed thereon in Comparative Example 2 is evaluated using the following method and summarized in the following Table 3.

Comparative Example 3

A grain-oriented electrical steel sheet having an insulation film formed thereon is formed in the same manner as in Example 11 except that 35 parts by weight of silica nanoparticles having an average particle diameter of 50 nm are used.

The magnetic flux density, iron loss, insulation film tension, and corrosion resistance of the grain-oriented electric steel sheet having the insulation film formed thereon in Comparative Example 3 is evaluated using the following method and summarized in the following Table 3.

TABLE 3

| | silica nanoparticle(parts by weight) | $B_{10}$(Tesla) | $W_{17/50}$(W/kg) | insulation (mA) | film tension (Mpa) | corrosion resistance |
|---|---|---|---|---|---|---|
| Example 11 | 5 nm (15 parts by weight) + 15 nm (20 parts by weight) | 1.91 | 1.04 | 75 | 4.5 | excellent |
| Example 12 | 5 nm (10 parts by weight) + 25 nm (10 parts by weight) + 40 nm (15 parts by weight) | 1.90 | 0.97 | 10 | 6.9 | excellent |
| Example 13 | 5 nm (5 parts by weight) + 12 nm (10 parts by weight) + 25 nm (10 parts by weight) | 1.91 | 1.03 | 55 | 5.4 | excellent |
| Comparative Example 1 | 5 nm (35 parts by weight) | 1.88 | 1.20 | 154 | 0.33 | good |
| Comparative Example 2 | 12 nm (35 parts by weight) | 1.88 | 1.24 | 168 | 0.30 | good |
| Comparative Example 3 | 50 nm (35 parts by weight) | 1.87 | 1.25 | 280 | 0.25 | average |

As may be seen from Table 3, in the grain-oriented electrical steel sheet having the insulation film formed thereon according to an example of the present invention that uses the inorganic nanoparticles having two or more kinds of particle diameter sizes, it is observed that the film tensions and insulation are better and the corrosion resistance is also improved.

Example 14

A grain-oriented electrical steel sheet having an insulation film formed thereon is formed in the same manner as in Example 11 except that magnesium phosphate is used instead of aluminum phosphate.

The magnetic flux density, iron loss, insulation film tension, and corrosion resistance of the grain-oriented electric steel sheet having the insulation film formed thereon in Example 14 is evaluated using the following method and summarized in the following Table 4.

Example 15

A grain-oriented electrical steel sheet having an insulation film formed thereon is formed in the same manner as in Example 11 except that calcium phosphate is used instead of aluminum phosphate.

The magnetic flux density, iron loss, insulation film tension, and corrosion resistance of the grain-oriented electric steel sheet having the insulation film formed thereon in Example 15 is evaluated using the following method and summarized in the following Table 4.

Example 16

A grain-oriented electrical steel sheet having an insulation film formed thereon is formed in the same manner as in Example 11 except that manganese phosphate is used instead of aluminum phosphate.

The magnetic flux density, iron loss, insulation film tension, and corrosion resistance of the grain-oriented electric steel sheet having the insulation film formed thereon in Example 16 is evaluated using the following method and summarized in the following Table 4.

Example 17

A grain-oriented electrical steel sheet having an insulation film formed thereon is formed in the same manner as in Example 11 except that strontium phosphate is used instead of aluminum phosphate.

The magnetic flux density, iron loss, insulation film tension, and corrosion resistance of the grain-oriented electric steel sheet having the insulation film formed thereon in Example 17 is evaluated using the following method and summarized in the following Table 4.

TABLE 4

| | metal phosphoric acid | $B_{10}$(Tesla) | $W_{17/50}$(W/kg) | insulation (mA) | film tension (Mpa) | corrosion resistance |
|---|---|---|---|---|---|---|
| Example 14 | phosphoric acid magnesium | 1.91 | 1.05 | 35 | 3.4 | excellent |
| Example 15 | phosphoric acid calcium | 1.91 | 1.08 | 82 | 2.1 | average |
| Example 16 | phosphoric acid manganese | 1.90 | 1.11 | 119 | 2.3 | good |
| Example 17 | phosphoric acid strontium | 1.90 | 1.20 | 105 | 4.7 | excellent |

As may be seen from Table 4, it may be seen that the grain-oriented electrical steel sheet having the insulation film formed thereon according to an example of the present invention has excellent electrical characteristics and excellent insulating properties, film tensions and corrosion resistance.

The exemplary embodiments and modified examples of the present invention have been described and shown with reference to the accompanying drawings, but the present invention is not limited to the exemplary embodiments and may be manufactured in various forms. As described above, it will be appreciated by those skilled in the art that changes may be made in these embodiments without departing from the principles and spirit of the general inventive concept, the scope of which is defined in the appended claims and their equivalents. Therefore, it should be understood that the exemplary embodiments described above are not limitative but are exemplary in all the aspects.

The invention claimed is:

1. An insulation film composition for a grain-oriented electrical steel sheet comprising 10-50 parts by weight of metal phosphate, 5-30 parts by weight of inorganic nanoparticles having a particle diameter of 1 nm to less than 10 nm, 5-20 parts by weight of inorganic nanoparticles having a particle diameter of 10 nm to less than 30 nm, and 5-20 parts by weight of inorganic nanoparticles having a particle diameter of 30 nm to less than 100 nm and 0.1-20 parts by weight of chromium oxide.

2. The insulation film composition of claim 1, wherein the metal phosphate includes at least one metal selected from Mg, Al, Ca, Fe, Mn, Sr, Zr and Ba.

3. The insulation film composition of claim 1, wherein the inorganic nanoparticles are at least one selected from alumina ($Al_2O_3$), silica ($SiO_2$), titania ($TiO_2$), zirconia ($ZrO_2$), yttrium oxide ($Y_2O_3$) and magnesium oxide (MgO).

4. The insulation film composition of claim 1, wherein the chromium oxide is at least one selected from chromium trioxide, chromium oxide, and chromium oxide.

5. The insulation film composition of claim 1, further comprising: 10-25 parts by weight of a solvent.

\* \* \* \* \*